United States Patent
Condolo

(10) Patent No.: US 11,295,470 B2
(45) Date of Patent: Apr. 5, 2022

(54) SYSTEMS AND METHODS FOR LOW-FREQUENCY AND HIGH-FREQUENCY SLAM

(71) Applicant: MINDMAZE HOLDING SA, Lausanne (CH)

(72) Inventor: Frederic Condolo, Lausanne (CH)

(73) Assignee: MINDMAZE HOLDING SA, Lausanne (CH)

( * ) Notice: Subject to any disclaimer, the term of this patent is extended or adjusted under 35 U.S.C. 154(b) by 0 days.

(21) Appl. No.: 16/582,675

(22) Filed: Sep. 25, 2019

(65) Prior Publication Data

US 2020/0254613 A1    Aug. 13, 2020

Related U.S. Application Data

(60) Provisional application No. 62/735,943, filed on Sep. 25, 2018.

(51) Int. Cl.
| | | |
|---|---|---|
| *G06T 7/73* | (2017.01) | |
| *B25J 9/16* | (2006.01) | |
| *G06T 7/246* | (2017.01) | |

(52) U.S. Cl.
CPC .............. *G06T 7/73* (2017.01); *B25J 9/1666* (2013.01); *B25J 9/1697* (2013.01); *G06T 7/246* (2017.01); *G06T 2207/30244* (2013.01)

(58) Field of Classification Search
CPC .. G06T 7/30; G06T 7/33; G06T 7/337; G06T 7/70; G06T 7/73; G06T 7/74; G06T 2207/30244; G01C 21/005; G01C 21/3804; G01C 21/3811; G01C 21/383; G01C 21/3841; G01C 21/3885; G01C 21/3889; G01C 21/3896; G05D 1/0231; G05D 1/0246
See application file for complete search history.

(56) References Cited

U.S. PATENT DOCUMENTS

| | | | |
|---|---|---|---|
| 2019/0212752 A1* | 7/2019 | Fong et al. | G06K 9/00 |
| 2020/0410702 A1* | 12/2020 | Zhang et al. | G01S 17/89 |

* cited by examiner

*Primary Examiner* — Andrew W Johns
(74) *Attorney, Agent, or Firm* — Graeser Associates International Inc; Dvorah Graeser

(57) ABSTRACT

Disclosed are various embodiments for a system, devices, and methods for simultaneous localization and mapping in a high- and low-frequency dynamic environment. One exemplary embodiment relates to a method that includes generating a first SLAM map of the environment; generating a second SLAM map of a portion of the environment at least in part from visual feature data received from a first client device located in the portion of the environment; receiving a localization signal from a second client device indicating the location of the client device; sending, in response to the localization signal, data that includes a minimum number of map points that a SLAM process on the second client device should be able to detect in the portion of environment.

13 Claims, 13 Drawing Sheets

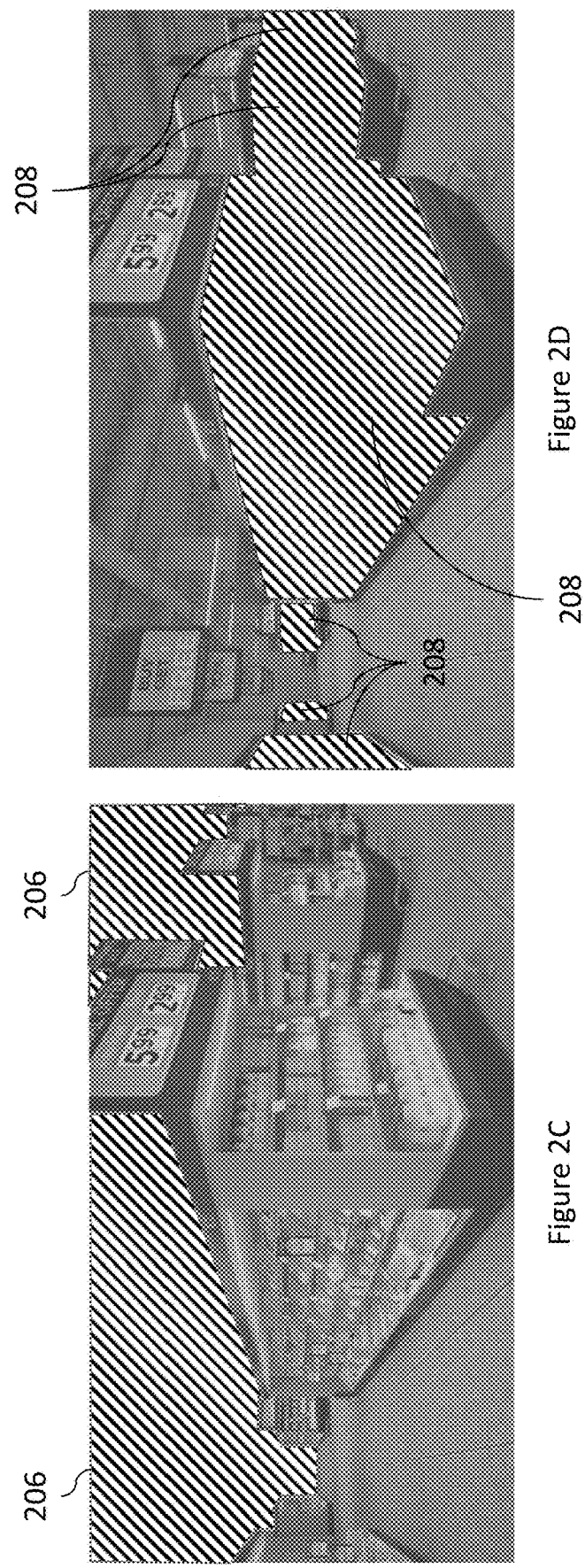

SYSTEMS AND METHODS FOR LOW-FREQUENCY AND HIGH-FREQUENCY SLAM

FIELD OF THE INVENTION

The present invention, in at least some embodiments, relates to systems and methods for low-frequency and high-frequency SLAM (Simultaneous Localization And Mapping), and in particular, such systems and methods that can accommodate a variable environment.

BACKGROUND OF THE INVENTION

The term SLAM refers to "Simultaneous Localization And Mapping", and was initially applied to problems of independent movement of a mobile robot (device). In some such systems, the location of the mobile device (e.g., robot) is necessary—that is, its location on a map of an environment, as is a map the environment, so that the mobile device can determine its relative location within that environment. In some known systems, however, these tasks cannot be performed simultaneously, which results in substantial delays when processing mobile device location information.

Current SLAM systems often have difficulty in handling environments which include many moving or changing visual features or visual features occluded by obstacles or obstructions. Some systems handle this by discarding or ignoring the variable or changing visual features. Some systems simply include those features in the mapping and localization process through sheer computing power or through complex algorithms for dealing with them appropriately. See, e.g., Yu, C., et al., DS-SLAM: A Semantic Visual SLAM Towards Dynamic Environments, Proceedings of the IEEE/RSJ International Conference on Intelligent Robots and Systems (IROS), October 2018; pp. 1168-1174.

Apple's ARKit and Google's ARCore segment the consumer market and cannot guarantee a similar experience to all customers:
  Limited to high-end devices, limiting the access to mass consumer market.
  Different behavior, strength and weaknesses of the algorithms, providing a non-homogenous experience.
  No guarantee about continuity of service and supported devices by Apple and Google.
  Customers and stores are less and less prone to share their data to Google and Apple.

In many real-world environments, practical difficulties prevent current monocular SLAM technologies from providing accurate localization information and generating accurate mapping changes. For example, in a business or other enclosed space in the real-world (e.g., supermarkets and the like), challenges include:
  Many sometimes-moving and sometimes-stationary people in the aisles or in front of aisles, hiding visual features to varying degrees any SLAM system would expect to see.
  Customers and employees constantly or randomly moving items, hence changing the visuals taken to create the map.

Additionally, current SLAM technologies such as ARKit and ARCore lack the stability needed in real-world environments.

Current systems fail to take into account the above challenges and provide required stability.

BRIEF SUMMARY OF THE INVENTION

The present invention overcomes the drawbacks of the background art by providing systems, apparatuses, and/or methods for providing SLAM in real-world, variable environments.

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

As discussed above, current systems lack necessary stability as shown by an experiment that involved placing different phones on a toy train on a set track to ensure the same path for each phone and then recording each session. The setup is illustrated in FIGS. 1A-1C.

FIG. 1A shows a photo of an exemplary setup for the experiment. FIG. 1B illustrates the session trace for the SLAM system used in embodiments of the present invention to account for vibration and as described in Int'l Patent Appl. Serial No. PCT/US18/14508, filed on filed on Jan. 19, 2018 with the US receiving office, and which is incorporated in its entirety as if set forth entirely herein. FIGS. 1C and 1D illustrate the session traces for ARCore from Google and ARKit from Apple, respectively.

The results show that ARKit probably relies too much on the very expensive IMUs that are embedded in the latest iPhones, and cannot properly handle the vibrations level a toy train can deliver. Very similar results would occur on a shopping trolley.

Embodiments of the instant invention are optimized to run on low-end devices to provide a similar experience to users regardless of the device they use. Embodiments are characterized by resilience to vibrations or jitter. For example, a device can be fixed on a rolling object with a variable number of wheels, such as a cart or can be handheld. Thus, preferred embodiments detect and account for jitter or aberrations in the movements of the wheeled object or the hand.

Additionally, depending on the context of the device or the user, intentional movements must be accounted for as well. For instance, a device in a supermarket context will be moved intentionally from side to side in an aisle, moving from one shelf to an opposite facing other shelf. In general, a SLAM device in the possession of a layperson interested in their own activities rather than the function of the SLAM device will behave unpredictably and such behavior should be accounted for.

Environments in which a layperson would use a SLAM device are also liable to be highly dynamic. In some contexts, there are a lesser and more dynamic areas. In particular, in commercial contexts such as stores there are lesser dynamic (i.e., low-frequency) and highly dynamic (i.e., high-frequency) areas, such as floor plans and shelf contents. Those of skill in the art can appreciate that other environments can be bifurcated into low- and high-frequency environments.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to as a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality.

Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIGS. 2A-2D illustrate an exemplary identification of high and low frequency zones in a commercial context.

DESCRIPTION OF SOME EMBODIMENTS

Figure 1A:
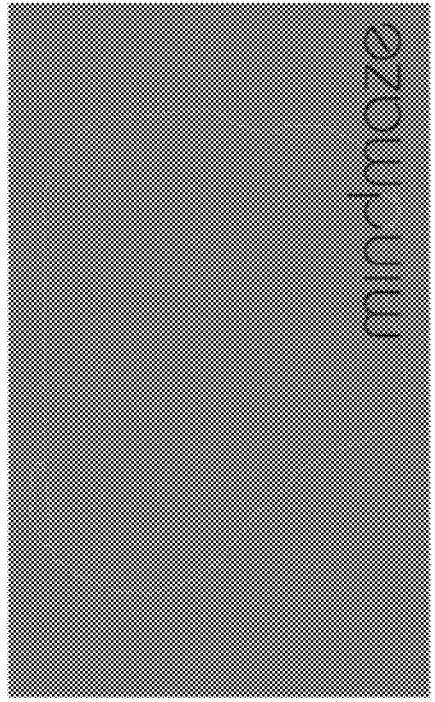
FIG. 1A shows a photo of an exemplary setup for an experiment to demonstrate the efficacy of the present invention in at least some embodiments.
Figure 1B:
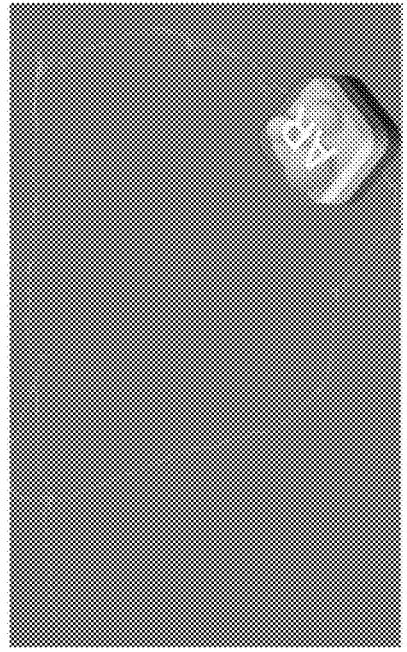
FIG. 1B illustrates the session trace for the SLAM system used in embodiments of the present invention to account for vibration.
Figure 1C:
FIGS. 1C and 1D illustrate the session traces for off the shelf apparatus.
Figure 1D:
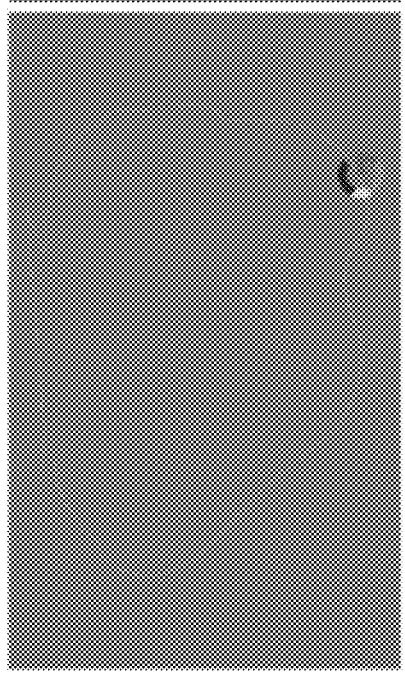
Figure 2B:
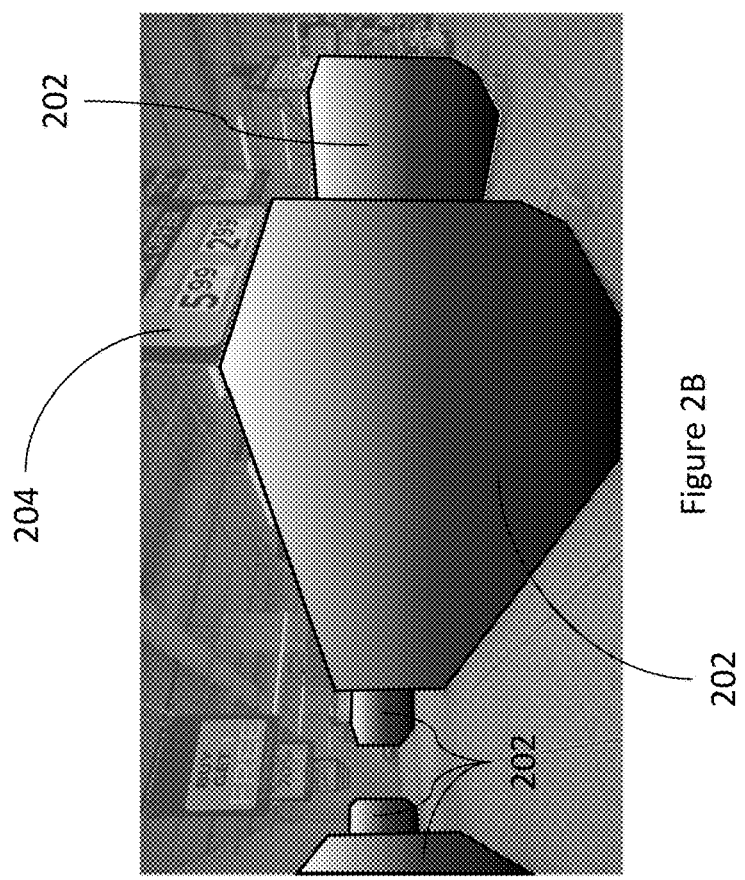
Figure 2A:

Referring to FIG. 2A, a typical shelf and aisles setup of a supermarket is shown as representative examples of high- and low-frequency areas of an environment. Different zones that are more or less reliable for a tracking algorithm can be determined. It should be understood that "high-frequency" relates to zones that are very prone to change more frequently (e.g., individual shelves), and "low-frequency"

relates to zones that are more reliable or less prone to change (e.g., aisles plans and placement). FIG. 2B illustrates some features that are less likely to change as a whole. Structures 202 are less likely to be moved themselves irrespective of the individual characteristics of the structures. Individual characteristics can include the number or placement of shelves in the structure, the types and characteristics of the items placed in the structure, accompanying features (e.g., signage 204), whether particular items are missing from shelves or have been moved, and the like.

A map can be initialized by mapping the global architecture or the aisles, as it is expected that these elements' position and size won't change too often and can be tagged as "low frequency reliable data." In accordance with preferred embodiments, other structure characteristics or contents are not mapped.

In a next initialization mapping, the ceiling and the top of the walls and other structures that comprise low frequency environment components (i.e., structures that change infrequently) are mapped to generate additional low frequency reliable data. In this step of initialization mapping, structures that are less prone to occlusion by customers or other objects are preferably included. The floor or ground could also be considered as very reliable in terms of consistency across time, but it will most of the time be hidden by walking by customers. FIG. 2C illustrates structural components 206 that could be mapped during this map initialization step.

In accordance with preferred embodiments, the contents of the low-frequency structures (e.g., shelves, shelf items, and the like) are considered non-mappable data and chaotic by essence. Still, these zones contain lots of colorful packaging and visual details that tracking algorithms need. FIG. 2D illustrates the regions 208 of high-frequency components. At this stage, although the regions 208 that represent high-frequency components are closely related to low-frequency components 202, the mapping discards information in these areas for this part of the process. This information is still relevant for other aspects. In preferred embodiments, the high-frequency items, as described below, can be used to estimate movement of a device within an area, but are not used to determine absolute position (or localization with the overall map)

Figure 3:
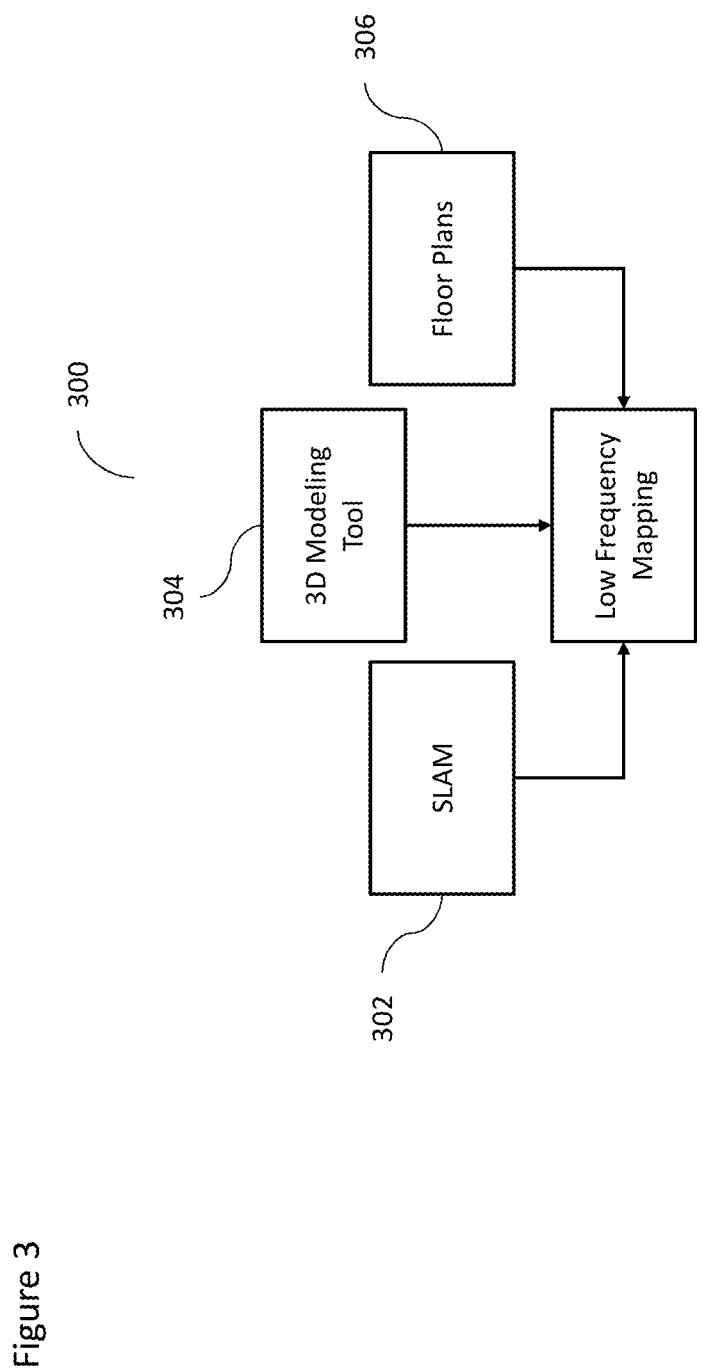
FIG. 3 illustrates an exemplary flow for generating low-frequency mapping data in accordance with embodiments.

FIG. 3 illustrates an exemplary method 300 for creating a low-frequency map. At step 302, a low-frequency 3D map is generated through a SLAM process. At 304, a 3D modeling tool can be used to generate a floor map of low-frequency components. At 306, traditional floor plan data can be used to generate, at least in part, a 3D floor map of low-frequency components. Such traditional floor plan data sources can be CAD files or any type of floor or area planning or modeling data files or data that indicates placement of low-frequency objects within the environment. It should be understood that embodiments can use one or more of the above steps to generate a low-frequency map.

Figure 4A:
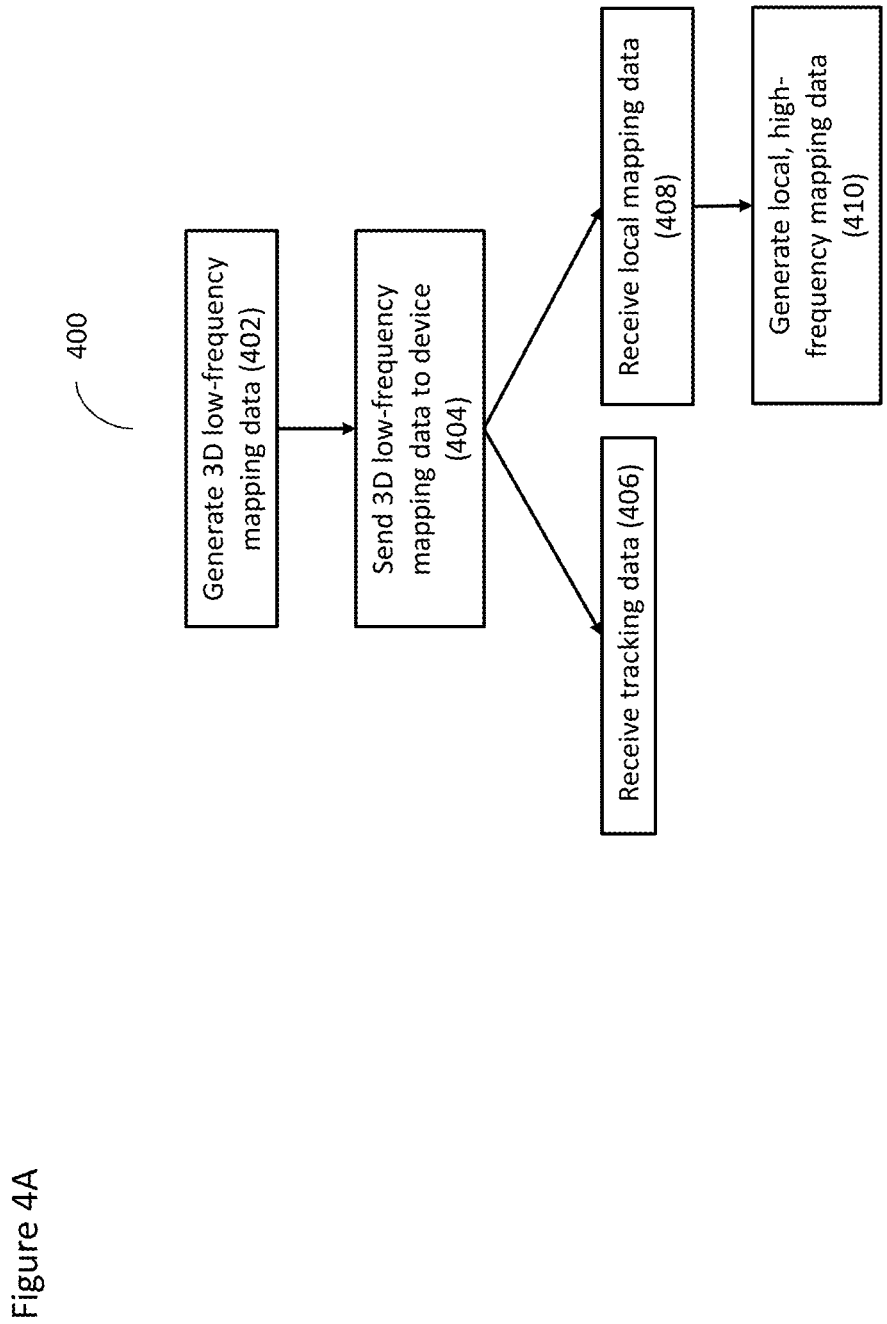
FIG. 4A illustrates an exemplary flow for generating mapping data in a low- and high-frequency environment in accordance with embodiments.

FIG. 4A illustrates a flowchart for an exemplary method 400 for low- and high-frequency mapping and localization. At step 402, a low-frequency 3D map is generated in accordance with the method illustrated in FIG. 3. At step 404, a 3D low-frequency map is sent to a device where a SLAM process is running. At step 406, tracking data can be received from the device. Tracking data can be sensor data that indicates the movement and/or location of the device such as IMU data for example. At step 408, local mapping data can be received from the device. The local mapping data can be mapping data for a high-frequency map of the local are in which the device is located or moving. In this way, a local map can be generated, at step 410, for other devices to be localized in the area based on the mapping from the device. In some embodiments, local mapping is done only on the device. In some embodiments, local mapping can be selectively done on the device located or moving in the local environment or on another device (e.g., another device in the environment, a central server, etc.).

Figure 4B:
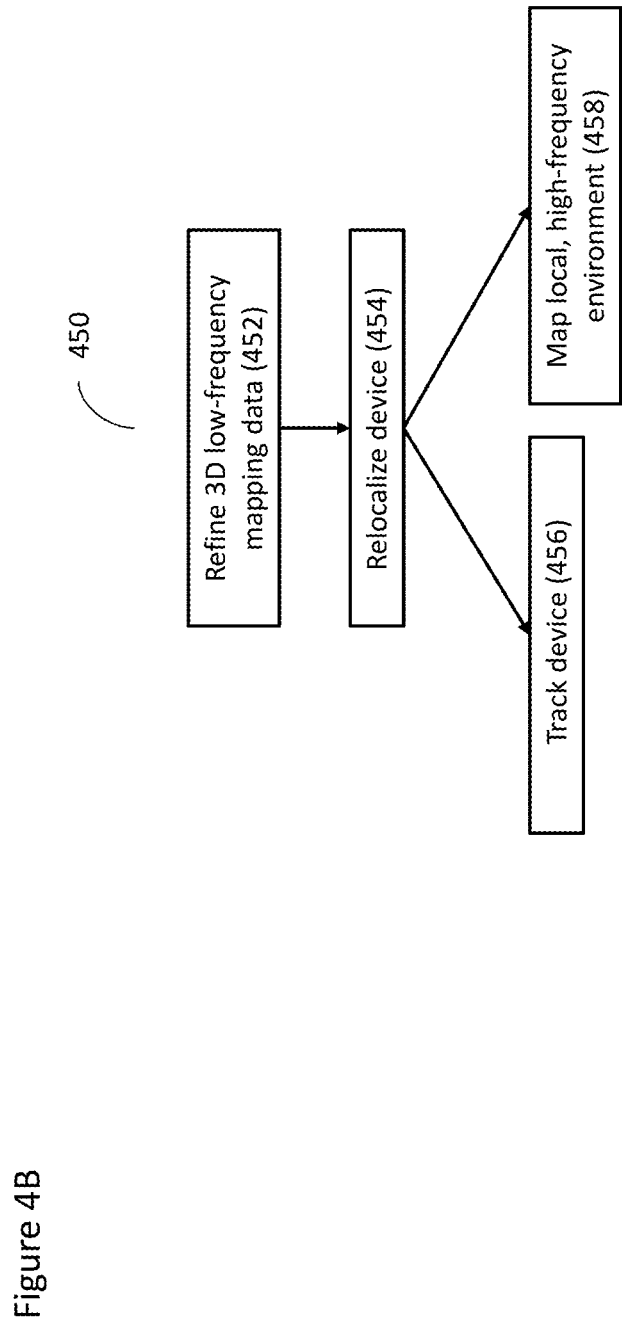
FIG. 4B illustrates an exemplary flow for SLAM on a client device in a low- and high-frequency environment in accordance with embodiments.

Referring now to FIG. 4B, a flowchart for a method 450 for localization and mapping a device located in the mapped environment in accordance with some embodiments is illustrated. At step 452, the low-frequency map is refined on the client device based on features detected that are not already in the map. In some embodiments, this step is infrequently performed given that the low-frequency map is understood to not change often. At step 454, relocalization is done. From the mapping data, a device is able to determine a strong absolute position within the environment. A problem that would be faced by a typical SLAM system is that reliable data is not always visible, and relocalization may occur only every 4 or 5 meters. At steps 456 and 458, tracking and local mapping are done, respectively. Thanks to high frequency features (e.g., shelves or other unreliable data) and IMU extrapolation routines, for example, as described in U.S. patent application Ser. No. 16/172,819, filed on Oct. 28, 2018, which is hereby incorporated in its entirety as if set forth entirely herein, which direction and at what magnitude the client device moved since last successful relocalization can be determined. It should be understood that one or more of the preceding techniques can be used to generate a low-frequency map for more precision. In accordance with preferred embodiments, low-frequency mapping is done once and stored on a local server.

It should be understood that the above described embodiments discuss only a low-frequency map and a high-frequency map, but that embodiments may include a hierarchy of more than two maps. For example, embodiments may use a third map which includes a more slowly changing set of visual features, but not as dynamic as a high-frequency area. In this case, a client device may be able to perform localization and mapping while the server may refine the map more often than for the low-frequency map. Additionally, in the same way that there can be multiple sets of high-frequency mapping data, each for a particular region; there can also be multiple low-frequency maps. In this way, more efficient data transmissions between client device and server can be created. And by using smaller high-frequency maps, client devices can operate a SLAM process faster.

Figure 5A:
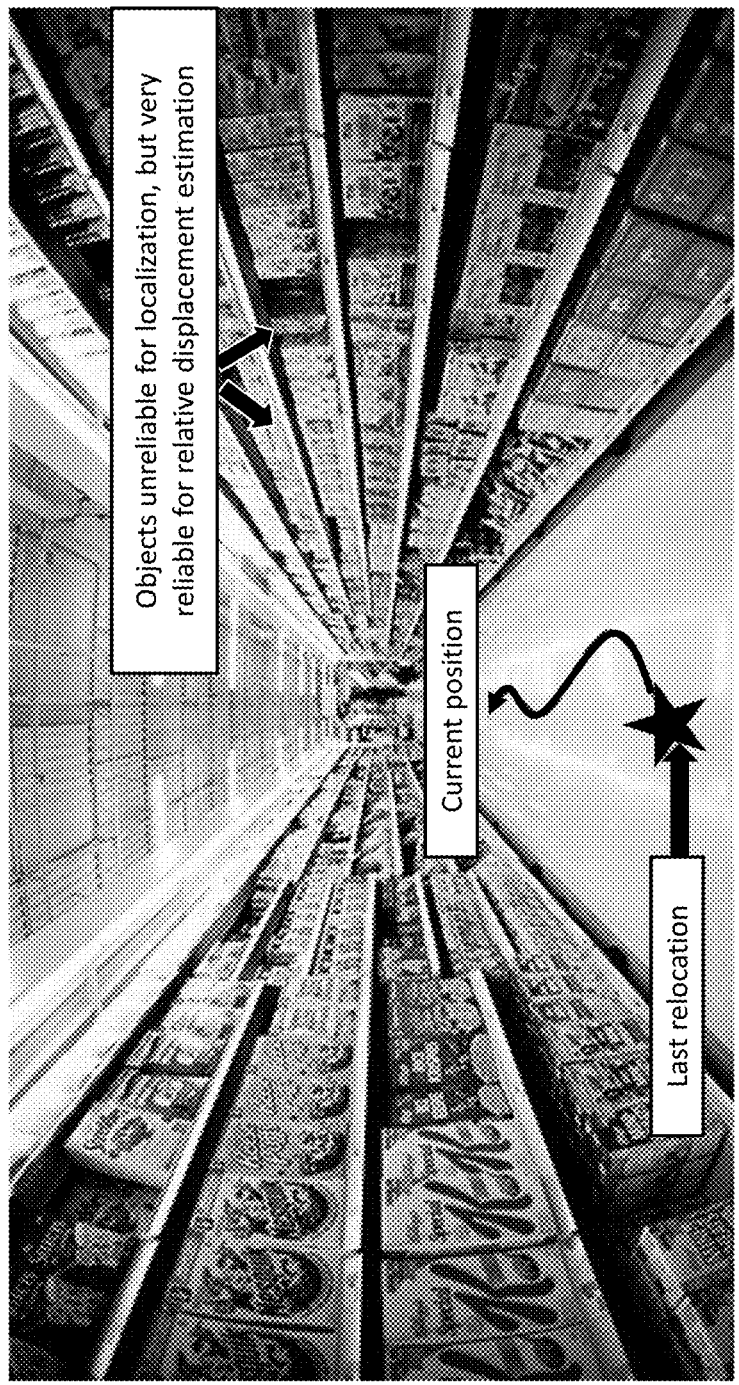
FIG. 5A illustrates an exemplary schematic for localization in a high-frequency environment in accordance with embodiments.
Figure 5B:
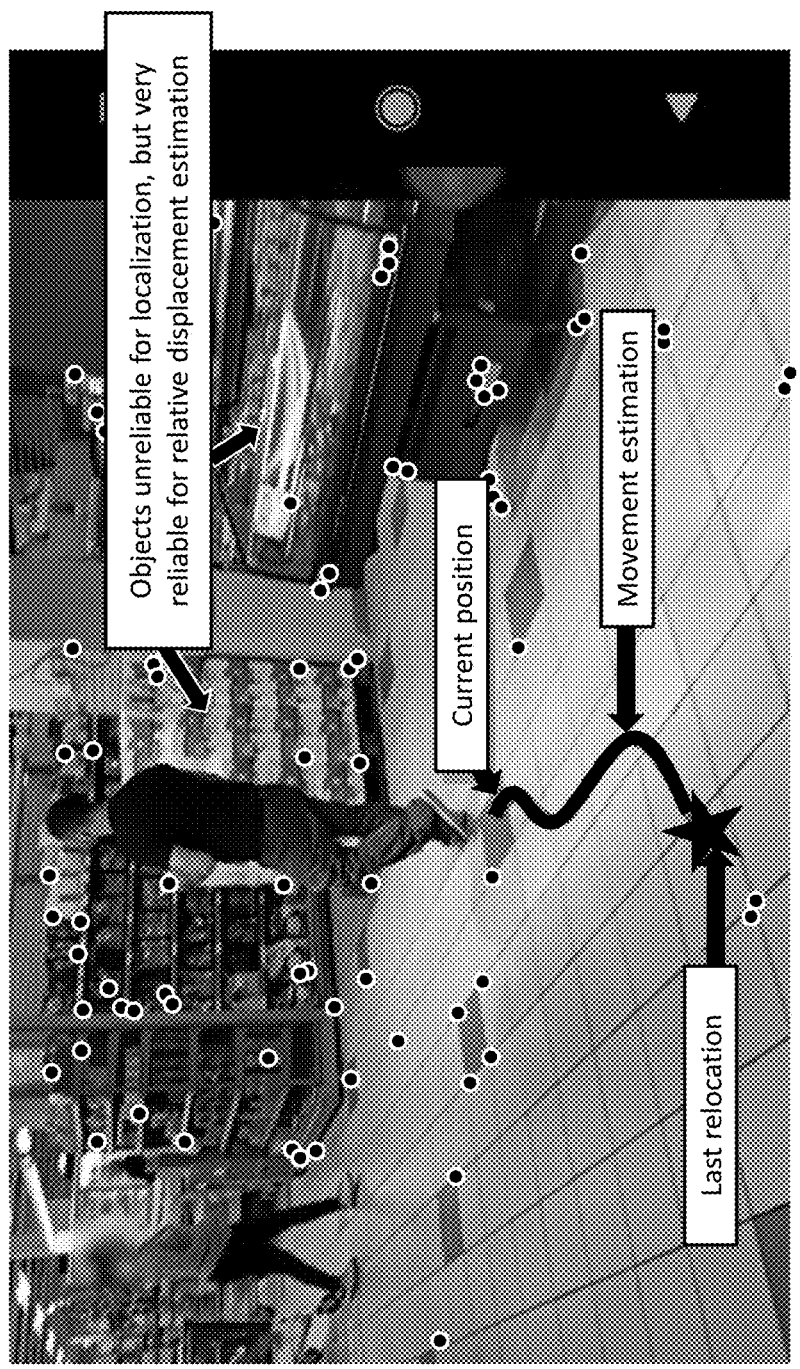
FIG. 5B illustrates an exemplary flow for localization in a high-frequency environment in accordance with embodiments.

FIG. 5A illustrates an example of a path taken by a client device among high-frequency components. Relative displacement of the client device is performed using IMU sensor measurements and localization within a high-frequency map. A typical SLAM system will attempt to determine whether some features are reliable for generating map and, if not, will discard the feature. In preferred embodiments here, however, unreliable features are not discarded but are still used for local relative displacement estimation. That is, in some embodiments, local mapping for the purpose of local relative displacement estimation is performed even if the local map is not retained. In some embodiments, local mapping is performed by a client device and relied on for relative displacement estimation but can also be used to generate a local map centrally, wherein the central local map is generated from a plurality of devices. FIG. 5B illustrates a visual depiction of a point cloud map points within a high frequency map that can be used to help determine displacement.

Crowd Tracking:

In accordance with preferred embodiments and as discussed further below, the mapping server can receive tracking data from connected client devices to reinforce or update the low-frequency map and to share high-frequency component data with other client devices. Data can be shared with devices based on periodic transmissions or other criteria, such as location of the client device within the environment.

Crowd Mapping Reinforcement:

In accordance with preferred embodiments, the mapping server can receive data about particular features from client devices. For example, in a retail context, when new features appear in a store (e.g., drinks pyramid in the middle of an aisle, etc.), a SLAM process on a client device can detect the feature or landmark. The client device can then generate a notification signal for a server indicating a new feature and then send the signal to the server. The server can then tally the notification signals indicating the new feature. The result is that this new feature gets more "votes" as more client devices (and therefore more customers) see the pyramid. Eventually, when the pyramid disappears and no more client can see it, the scoring will go down naturally. This way, the map can be kept up to date and adapt to minor modifications. Landmark detection is described more fully in U.S. patent application Ser. No. 16/172,819.

Figure 6A:
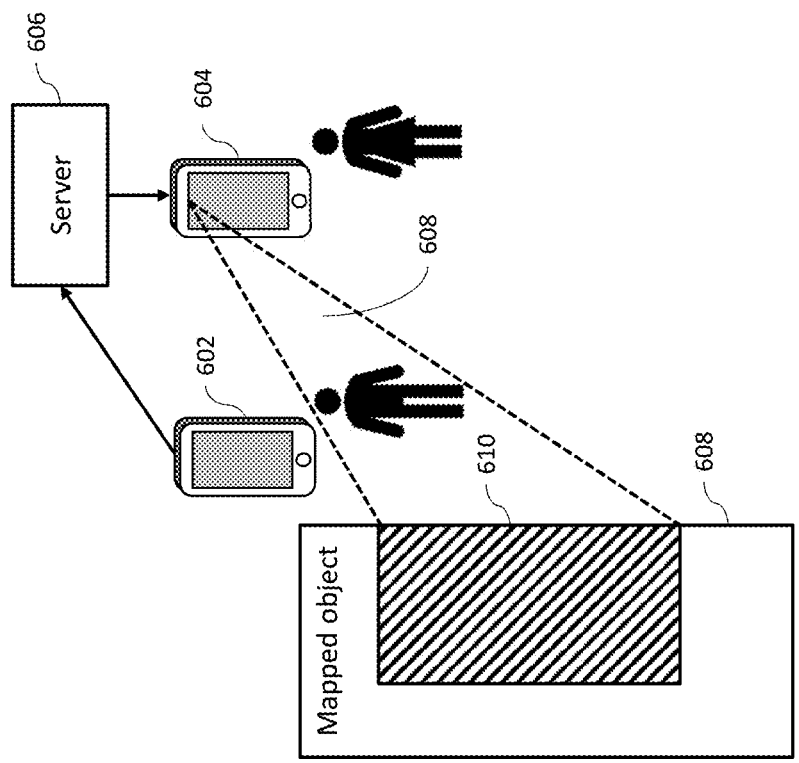
FIG. 6A illustrates an exemplary schematic for a SLAM process in an occluded high-frequency environment in accordance with embodiments.

FIG. 6A illustrates an exemplary depiction of one situation in which crowd mapping is used. One client device 602 is able to track based on high-frequency components. Another client device 604 is blocked from using visual tracking based on the high-frequency components of region 608 that are within obstructed area 610. In such a situation, server 606 can receive reliable tracking data from device 602 and transmit the mapping data to device 604 so that device 604 can use reliable high-frequency mapping data without performing mapping itself.

Figure 6B:
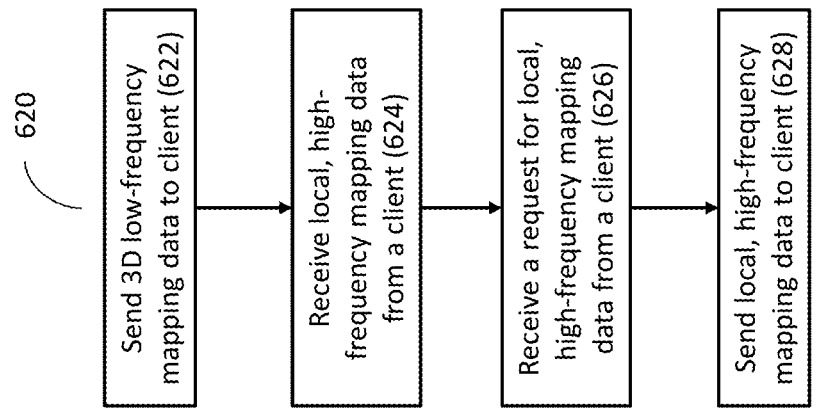
FIGS. 6B and 6C illustrate exemplary flows for localizing a client device in a possibly-occluded high-frequency environment in accordance with embodiments.
Figure 6C:
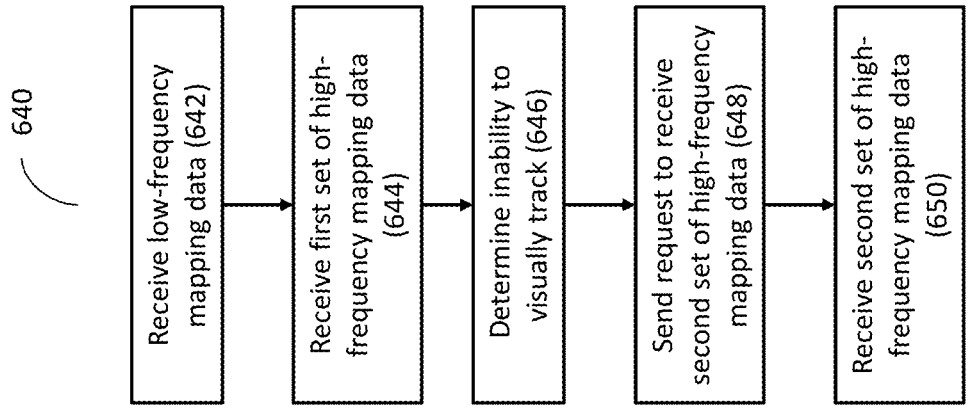

Referring to FIG. 6B, a flowchart for an exemplary method 620 of localizing a device in a low- and high-frequency environment in accordance with embodiments is shown. At 622, a 3D low-frequency map is sent to a client device. At 624, high-frequency mapping data is received from a client device. In some embodiments, data that locates certain objects in the high-frequency map can be received from the client as well. At 626, a request for local, high-frequency mapping data is received from a client device. Such a request signal can be received in accordance with the depiction of FIG. 6A. At step 628, high-frequency mapping data is sent to the client device from which the request signal was received. In accordance with some embodiments, a request signal can be received by virtue of a device localizing to the high-frequency area as determined based on localization within the low-frequency area, as is described in further detail below. In some embodiments, the localization data can be used to generate a notification about the local area of the device, and the notification can then be sent to the device. For example, in a commercial or retail context, the server can generate a message that informs the device user about a feature in the local area and then send the message to the device. As noted above, in preferred embodiments, the low-frequency map is generated once and stored. In other words, it can be generated and then not refined through the SLAM process. Thus, when a device is connected to the service, it can retrieve the map data, as well as the location of the needed items. Employees update items position in the map by simply scanning the bar codes at the item's position.

Referring now to FIG. 6B, a flowchart illustrating a method 640 for SLAM on a device in accordance with embodiments, particularly embodiments in accordance with FIG. 6A, is shown. At step 642, the device receives low-frequency mapping data. At step 644, the device receives high-frequency mapping data for its local area. At step 646, a SLAM process on the device determines that the device is unable to visually track (for example, because of an obstacle or obstruction as in FIG. 6A) in the high-frequency local area. Step 646 can be done based on other conditions such as a desire to lower processor load or other reasons for preventing the device from performing high-frequency mapping itself so that it is required only to localize. At step 648, the device sends a request signal to receive second set of high-frequency mapping data for the local area. At step 650, the device receives the second set of high-frequency mapping data. As discussed further in connection with FIG. 7, in some embodiments, the first set need not be a map itself but calibration information for the device to perform high-frequency mapping itself. In some embodiments, can eliminate steps 644 and or step 646 altogether.

Figure 7:
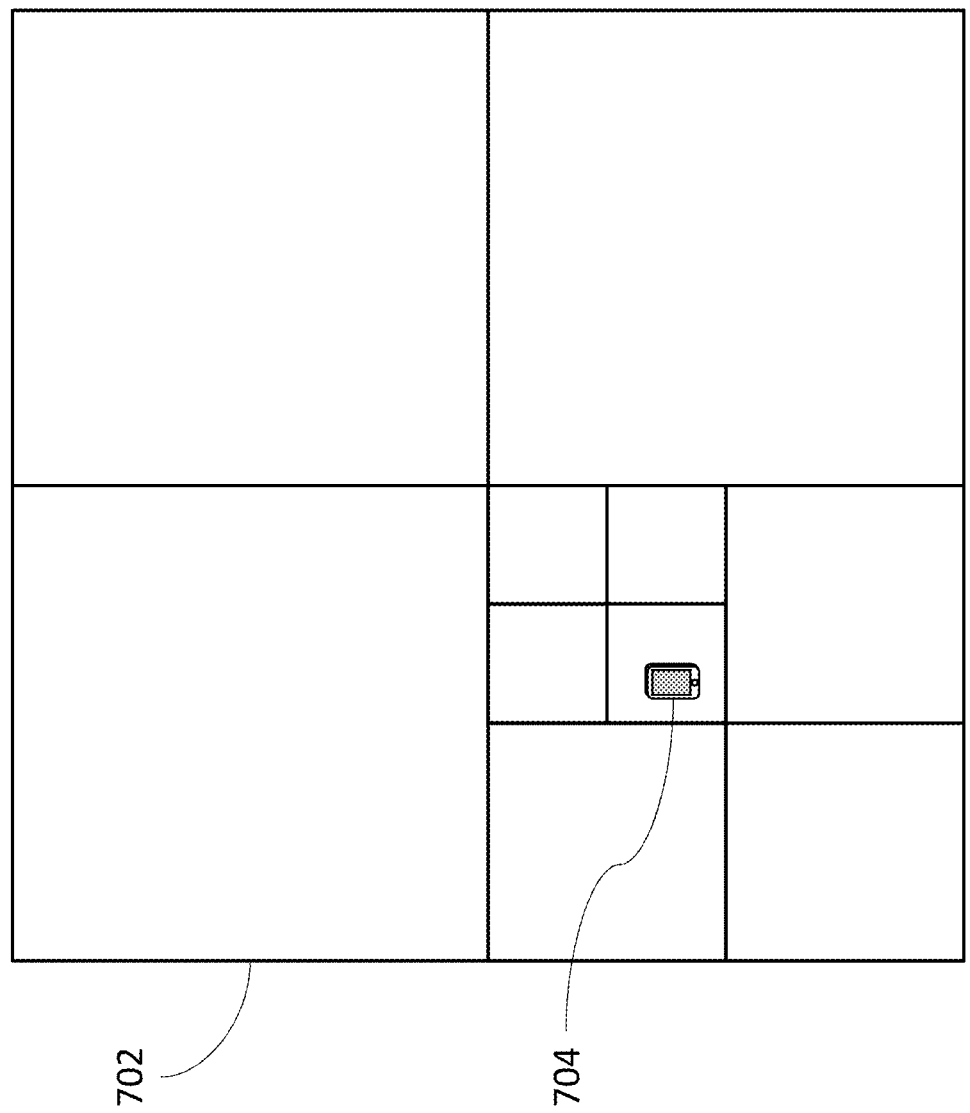
FIG. 7 illustrates an exemplary schematic for localizing a client device in a low- and high-frequency environment in accordance with embodiments.

FIG. 7 illustrates one exemplary schematic for combining low- and high-frequency SLAM techniques using a quad tree 702. Device 704 localizes itself within the low-frequency map and determines it is within a particular quadrant in the tree. In preferred embodiments, the server can transmit information about the quad to the device, including the number of points or a point range of map points that it should be able to detect in the high-frequency map for the quadrant. If the device 704 determines that it cannot detect the appropriate number of points, it can request the server to transmit a reliable high-frequency map for the quadrant. The determination that an appropriate number of points can be made according to methods known to those of ordinary skill in the art. As the device 704 moves from one quadrant to another, the high-frequency map refresh on the device is performed for the new quadrant. Methods other than a quad tree can be used such as BSP, Kalman tree, bounding volumes, oak tree segmentation, and the like. The quad tree 702 of FIG. 7 is two dimensional. It should be understood that, in accordance with preferred embodiments, three-dimensional models can be used as well.

Figure 8:
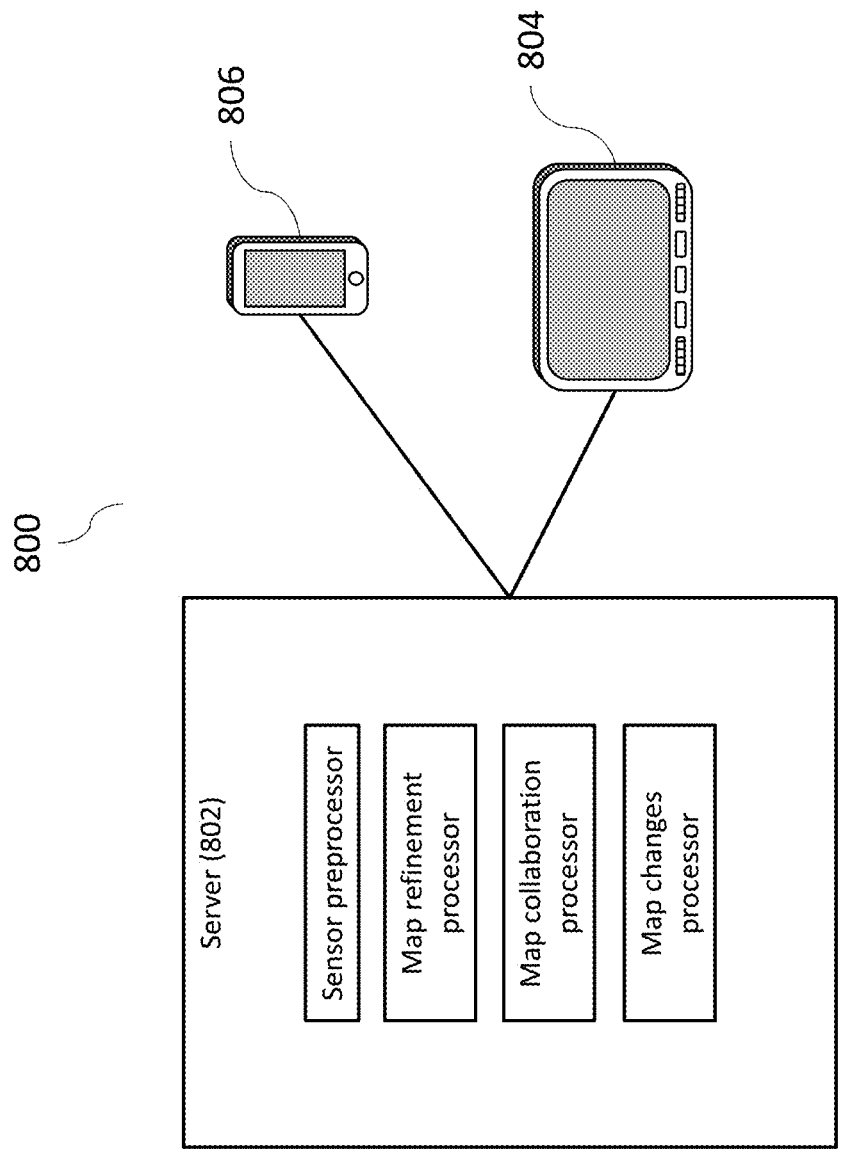
FIG. 8 illustrates an exemplary schematic for a SLAM system in a low- and high-frequency environment in accordance with embodiments.

The particular system components used by embodiments of the present invention correspond to system components as described in Int'l Patent Appl. Serial No. PCT/US18/14508 and U.S. patent application Ser. No. 16/172,819. FIG. 8 illustrates an exemplary system configuration 800 that includes a central server 802 having mapping modules and different client devices 804, 806 in communication with the central server.

For example, at central server 802, a sensor preprocessor may process various signals that are received as described herein, including but not limited to IMU signals and/or visual data (including but not limited to camera data), for example from devices 804, 806. A map collaboration processor can then perform initial mapping from data received from the sensors and/or otherwise from devices 804, 806. For speed, this collaboration processor may be configured to define a map rapidly and in a coarse-grained or rough manner, using the preprocessed sensor data. The map refinement processor can be configured to refine this rough map to create a more defined map, optionally including being configured to correct for drift. Drift can occur as the calculated map gradually begins to differ from the true map, due to measurement and sensor errors for example. For example, such drift can cause a circle to not appear to be closed, even if movement of the sensor should have led to its closure. The map changes processor may be implemented to assist in more rapidly updating the map as more information is received.

Each of the computational devices as described herein, such as devices 804, 806, and server 802, may be described as comprising a processor and memory. Functions of the processor preferably relate to those performed by any suitable computational processor, which generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, each such memory is configured for storing a defined native instruction set of codes. The processor is configured to perform a defined set of basic operations in response to receiving a corresponding basic instruction selected from the defined native instruction set of codes stored in the memory.

For example, server 802 could initiate the process by obtaining a first map of the environment on which the SLAM process is to be performed. The first map may be generated according to a SLAM process, a 3D modeling tool data, or a floor plan modeling tool data for example. Server 802 may then receive visual data from a first client device located in a portion of the environment, which could be device 804. The server processor may then execute a first set of machine codes selected from the native instruction set for generating a SLAM map of a portion of the environment at least in part from the visual data. Next server 802 may receive a localization signal from a second client device indicating the location of the second client device, which could be device 806.

The server processor may then execute a second set of machine codes selected from the native instruction set for determining a minimum number of map points that a SLAM process on the second client device should be able to detect in the portion of environment. Server 802 would then send, in response to the localization signal, data that includes said minimum number of map points to said second client device.

The second client device may also comprise a second processor and a second memory, wherein said second memory stores a defined native instruction set of codes; wherein said second processor is configured to perform a defined set of basic operations in response to receiving a corresponding basic instruction selected from said defined native instruction set of codes. The second processor may execute a first set of machine codes selected from the native instruction set for detecting a plurality of map points according to a SLAM process. The second processor may then execute a second set of machine codes selected from the native instruction set for comparing said detected map points to said received map points. The second processor may then execute a third set of machine codes selected from the native instruction set for requesting the SLAM map from server 802 after not detecting the minimum number of map points.

Embodiments, as noted above, can be used in a retail environment in which customers are guided through a retail outlet. In some instances, embodiments can be used to guide customers through a store and, based on the customers location or movements as derived from the SLAM process data, a server or client device can generate a notification to inform the customer of the location of certain items, inform the customer that certain items are near, and the like. For example, if the client device localizes itself in a region near a particular product or item that may be of interest to the customer or that a store, for example, is interested in advertising, a server or client device can generate a notification user interface element for presentation to the customer on the client device. In some instances, the Manhattan distance can be the same through the aisles of a store for a customer's desired path, but a store may want a customer to see particular goods or aisle/section of goods, because of their buying behavior (e.g., the customer purchases certain product on regular cycles and the store may have a voucher for the product). This kind of path suggestion can be based on other criteria such as the customer's cumulative path or a promotion independent of prior customer behavior. Again, a server or client device can be configured with data that implement rules which can be compared with SLAM tracking data and programming code for generating notification signals, direction signals, and the like to be translated into user interface elements for the customer.

Embodiments can be used in other contexts as well. In some instances SLAM tracking data can be used to for gauging the performance inventory stocking, in a store, warehouse, or other similar environment. For example, a high-frequency map can be refined or updated as a shelf is restocked. SLAM process data can be overlaid with scan (e.g., barcode scan) data to determine efficiency metrics (e.g., time to restock, time between scans, distance traveled between scans, total distance during restock, etc.) for restocking.

Embodiments can be used in an alternative reality (AR) environment in which SLAM mapping data is used to determine whether a high-frequency local area has a certain appearance. For example, in the context described in the paragraph above, SLAM mapping data can be compared against the contents of a shelf as they should be, for example, in an AR environment, to determine whether shelf items are properly located or organized. Those of skill in the art can appreciate that a virtual shelf plan could be generated for the AR environment. The visual tracking data (e.g., image feature points) from the SLAM process could then be compared against image points from the virtual image.

Some embodiments described herein relate to a computer storage product with a non-transitory computer-readable medium (also referred to as a non-transitory processor-readable medium) having instructions or computer code thereon for performing various computer-implemented operations. The computer-readable medium (or processor-readable medium) is non-transitory in the sense that it does not include transitory propagating signals (e.g., a propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages and/or other development tools.

Those skilled in the art can readily recognize that numerous variations and substitutions may be made to the disclosed embodiments, their use and their configuration to achieve substantially the same results as achieved by the embodiments described herein. Accordingly, there is no intention to limit the disclosed embodiments or the claimed inventions to the disclosed exemplary forms. Many variations, modifications and alternative constructions fall within the scope and spirit of the inventions as expressed in the claims.

I claim:

1. A method for simultaneous localization and mapping (SLAM) in a dynamic environment comprising:
    generating a first SLAM map of the environment;
    generating a second SLAM map of a portion of the environment at least in part from visual feature data received from a first client device located in the portion of the environment;
    receiving a localization signal from a second client device indicating the location of the second client device;
    sending, in response to the localization signal, data that includes a minimum number of map points that a SLAM process on the second client device should be able to detect in the portion of environment.

2. The method of claim 1, wherein the first SLAM map is generated at least in part from one of a SLAM process, a 3D modeling tool data, and a floor plan modeling tool data.

3. The method of claim 1, further comprising:
    receiving, from the second client device, a request to receive the second SLAM map in response to a SLAM process on the second client device not detecting the minimum number of map points.

4. The method of claim 3, further comprising:
    sending, in response to the request, at least a portion of the second SLAM map to the second client device.

5. The method of claim 1, further comprising:
    sending, in response to the localization signal, a notification signal to the second client device of the location of an item in the portion of the environment.

6. The method of claim 1, further comprising:
    receiving from the second client device, SLAM mapping data for the portion of the environment; and
    refining the second SLAM map based on the received SLAM mapping data.

7. The method of claim 6, further comprising:
    detecting a landmark within the SLAM mapping data; and
    incrementing a count of the number of times the landmark is detected in SLAM mapping data received from client devices.

8. A method for simultaneous localization and mapping (SLAM) in a dynamic environment, the method being at least partially performed by a computational device, the computational device comprising a processor and a memory, wherein said memory stores a defined native instruction set of codes; wherein said processor is configured to perform a defined set of basic operations in response to receiving a corresponding basic instruction selected from said defined native instruction set of codes; the method comprising:
    obtaining a first map of the environment by the computational device;
    receiving visual data from a first client device located in the portion of the environment by the computational device;
    executing by said processor a first set of machine codes selected from the native instruction set for generating a SLAM map of a portion of the environment at least in part from the visual data;
    receiving a localization signal from a second client device indicating the location of the second client device by the computational device;
    executing by said processor a second set of machine codes selected from the native instruction set for determining a minimum number of map points that a SLAM process on the second client device should be able to detect in the portion of environment; and
    sending, in response to the localization signal, data that includes said minimum number of map points to said second client device.

9. The method of claim 8, wherein said second client device comprises a second processor and a second memory, wherein said second memory stores a defined native instruction set of codes; wherein said second processor is configured to perform a defined set of basic operations in response to receiving a corresponding basic instruction selected from said defined native instruction set of codes; the method further comprising:
    executing by said second processor a first set of machine codes selected from the native instruction set for detecting a plurality of map points according to a SLAM process;
    executing by said second processor a second set of machine codes selected from the native instruction set for comparing said detected map points to said received map points; and
    executing by said second processor a third set of machine codes selected from the native instruction set for requesting from the computational device the SLAM map after not detecting the minimum number of map points.

10. The method of claim 8, wherein said obtaining said first map of the environment comprises generating the first map at least in part from one of a SLAM process, a 3D modeling tool data, and a floor plan modeling tool data.

11. The method of claim 10, wherein said generating the first map comprises mapping a global architecture of the environment, wherein said global architecture comprises elements changing position and/or size with a frequency below a threshold.

12. The method of claim 11, wherein said generating the first map comprises mapping structures having a likelihood to being prone to occlusion below a threshold.

13. The method of claim 9, wherein said executing by said processor said first set of machine codes selected from the native instruction set for generating said SLAM map comprises an initialization phase, wherein said initialization phase comprises detecting elements changing position and/or size with a frequency below a threshold.

* * * * *